(12) United States Patent
Li et al.

(10) Patent No.: US 12,362,632 B2
(45) Date of Patent: Jul. 15, 2025

(54) ELECTRIC MACHINE ASSEMBLY INCLUDING HOUSING ASSEMBLY AND FAN POSITIONED WITHIN HOUSING ASSEMBLY

(71) Applicant: Regal Beloit America, Inc., Beloit, WI (US)

(72) Inventors: Wenbing Li, Changzhou (CN);
Jiannan Wu, Changzhou (CN);
Hongbo Tang, Changzhou (CN);
Jianbo Zhao, Changzhou (CN);
Xiaoqun Zhang, Changzhou (CN);
Mingjun Zhao, Changzhou (CN)

(73) Assignee: Regal Beloit America, Inc., Milwaukee, WI (US)

( * ) Notice: Subject to any disclaimer, the term of this patent is extended or adjusted under 35 U.S.C. 154(b) by 270 days.

(21) Appl. No.: 17/871,229

(22) Filed: Jul. 22, 2022

(65) Prior Publication Data

US 2023/0025849 A1 Jan. 26, 2023

(30) Foreign Application Priority Data

Jul. 22, 2021 (WO) ................ PCT/CN2021/107902

(51) Int. Cl.
*H02K 5/20* (2006.01)
*H02K 5/18* (2006.01)
(Continued)

(52) U.S. Cl.
CPC ............... *H02K 9/14* (2013.01); *H02K 5/18* (2013.01); *H02K 5/20* (2013.01); *H02K 5/207* (2021.01); *H02K 5/225* (2013.01); *H02K 9/06* (2013.01)

(58) Field of Classification Search
CPC ...... H02K 5/207; H02K 9/02–06; H02K 5/18; H02K 5/225; H02K 11/33; H02K 1/20; H02K 9/14–18
See application file for complete search history.

(56) References Cited

U.S. PATENT DOCUMENTS 3,502,916 A * 3/1970 Stavrache ............... H02K 9/14
310/59
4,162,419 A * 7/1979 DeAngelis ............... H02K 9/06
310/68 D
(Continued)

FOREIGN PATENT DOCUMENTS

CN 102025223 A * 4/2011 ............... H02K 9/04
CN 103219832 A 7/2013
(Continued)

OTHER PUBLICATIONS

International Search Report and Written Opinion for International App. No. PCT/CN2021/107902, mailed Jan. 4, 2022, 13 pages.

*Primary Examiner* — Oluseye Iwarere
*Assistant Examiner* — Daniel K Schlak
(74) *Attorney, Agent, or Firm* — Armstrong Teasdale LLP (57) ABSTRACT

An electric machine including a housing assembly including a first end and a second end, a stator, a rotor, and a fan is provided. The housing assembly includes a terminal box positioned at the first end, an end plate coupled to the terminal box and including a plurality of inlet apertures, and a casing coupled to the end plate and extending toward the second end. The stator is fixedly secured to the housing assembly and positioned within the casing. The rotor is rotatably secured to the housing assembly and positioned within the casing such that the stator and the rotor are separated within the casing by an air gap. The fan is positioned inside the casing and is configured to draw air into the housing assembly through the plurality of inlet apertures.

19 Claims, 10 Drawing Sheets (51) Int. Cl.
*H02K 5/22* (2006.01)
*H02K 9/06* (2006.01)
*H02K 9/14* (2006.01)

(56) References Cited

U.S. PATENT DOCUMENTS

| | | | | |
|---|---|---|---|---|
| 4,465,948 | A * | 8/1984 | Oyama | H02K 9/06 310/58 |
| 4,521,154 | A * | 6/1985 | Corbett | F04D 29/281 416/182 |
| 5,006,743 | A * | 4/1991 | King | H02K 11/33 310/89 |
| 5,079,464 | A * | 1/1992 | King | H02K 11/33 310/89 |
| 5,214,325 | A * | 5/1993 | Matson | H02K 9/06 310/58 |
| 6,184,600 | B1 * | 2/2001 | Asao | H02K 11/05 165/47 |
| 6,351,046 | B1 * | 2/2002 | Bradfield | H02K 7/1004 310/90 |
| 6,417,585 | B1 * | 7/2002 | Oohashi | H02K 5/207 310/58 |
| 6,563,240 | B2 * | 5/2003 | Lin | H02K 5/10 310/58 |
| 6,657,338 | B2 * | 12/2003 | Fisher | H02K 11/23 310/71 |
| 6,734,587 | B2 * | 5/2004 | Hirsou | H02K 5/15 310/68 D |
| 6,809,443 | B2 * | 10/2004 | Nakamura | H02K 11/05 310/68 D |
| 6,873,069 | B1 | 3/2005 | Odagiri et al. | |
| 7,378,766 | B2 * | 5/2008 | Vasilescu | H02K 9/225 310/58 |
| 7,541,701 | B2 * | 6/2009 | Lin | H02K 9/14 310/58 |
| 7,629,719 | B2 * | 12/2009 | Hamada | H02K 5/225 310/68 D |
| 7,863,783 | B2 * | 1/2011 | Hamada | H02K 11/05 310/59 |
| 8,400,028 | B2 * | 3/2013 | Hayashi | H02K 9/06 310/58 |
| 8,487,490 | B2 * | 7/2013 | Dutau | H02K 9/14 310/59 |
| 9,013,076 | B2 * | 4/2015 | Hall | H02K 5/16 310/59 |
| 9,160,207 | B2 * | 10/2015 | Zeng | H02K 5/24 |
| 9,531,239 | B2 * | 12/2016 | Maschke | H02K 11/33 |
| 9,716,420 | B2 * | 7/2017 | Cocks | F04D 25/082 |
| 9,812,920 | B2 * | 11/2017 | McKinzie | H02K 9/227 |
| 9,853,522 | B2 * | 12/2017 | Hasegawa | H02K 9/06 |
| 10,243,422 | B2 * | 3/2019 | Minogue | H02K 5/1732 |
| 10,340,771 | B2 * | 7/2019 | Otsuka | H02K 11/33 |
| 10,348,152 | B2 * | 7/2019 | Malovec | H02K 9/06 |
| 10,498,196 | B2 * | 12/2019 | Hasegawa | H02K 9/06 |
| 11,005,330 | B2 * | 5/2021 | Dib | H02K 9/06 |
| 11,264,868 | B2 * | 3/2022 | Eason | H02K 11/33 |
| 11,496,024 | B2 * | 11/2022 | Zeng | H02K 5/20 |
| 2006/0012254 | A1 * | 1/2006 | Einheuser | H02K 11/05 310/58 |
| 2012/0027597 | A1 * | 2/2012 | Kang | F04D 29/282 416/183 |
| 2014/0175914 | A1 * | 6/2014 | Zeng | H02K 11/33 310/51 |
| 2015/0263591 | A1 * | 9/2015 | Maschke | H02K 9/06 310/62 |
| 2016/0079824 | A1 * | 3/2016 | McKinzie | H02K 5/207 310/58 |
| 2016/0344251 | A1 * | 11/2016 | Minogue | F04D 25/082 |
| 2018/0238337 | A1 * | 8/2018 | Kneip | H02K 1/2733 |
| 2019/0186500 | A1 * | 6/2019 | Hohn | H02K 5/207 |
| 2022/0034311 | A1 * | 2/2022 | Magyar | F04B 49/20 |
| 2022/0271621 | A1 * | 8/2022 | Crosson | H02K 9/08 |

FOREIGN PATENT DOCUMENTS

| | | | | |
|---|---|---|---|---|
| CN | 106438466 | A * | 2/2017 | F04D 29/28 |
| CN | 108832773 | A | 11/2018 | |
| CN | 114123636 | A * | 3/2022 | H02K 7/04 |
| CN | 114649893 | A * | 6/2022 | H02K 5/18 |
| CN | 116094249 | A * | 5/2023 | H02K 11/30 |
| CN | 117543874 | A * | 2/2024 | H02K 11/30 |
| DE | 2952503 | A * | 7/1980 | H02K 9/06 |
| DE | 202008015895 | U1 * | 3/2009 | H02K 11/33 |
| DE | 102013108506 | A1 | 2/2015 | |
| DE | 102015204026 | B3 | 6/2016 | |
| EP | 0823554 | A1 | 2/1998 | |
| FR | 2811157 | A1 * | 1/2002 | F04D 29/281 |
| WO | WO-2014160268 | A1 * | 10/2014 | H02K 5/18 |
| WO | WO-2015150100 | A1 * | 10/2015 | H02K 1/32 |
| WO | WO-2016173188 | A1 * | 11/2016 | H02K 5/10 |
| WO | 2017021244 | A1 | 2/2017 | |
| WO | 2017064081 | A1 | 4/2017 | |
| WO | WO-2017089670 | A1 * | 6/2017 | H02K 1/243 |

* cited by examiner

ELECTRIC MACHINE ASSEMBLY INCLUDING HOUSING ASSEMBLY AND FAN POSITIONED WITHIN HOUSING ASSEMBLY

CROSS-REFERENCE TO RELATED APPLICATIONS

This application claims the benefit of priority to International Patent Application No. PCT/CN2021/107902, filed Jul. 22, 2021 in the Chinese Receiving Office, the contents of which are hereby expressly incorporated by reference in their entirety.

BACKGROUND

The field of the disclosure relates generally to electrical machine assemblies and, more particularly, to cooling fans for motor assemblies and electronic components of the electrical machine assemblies.

Some known electrical machines include terminal boxes with electrical components therein, the electrical components configured to control components (e.g., a motor including a rotor and stator, a cooling fan, etc.) of the electrical machine. Typically, an external fan fluidly coupled to the terminal boxes and the electrical components therein is used to cool the terminal boxes and electrical components. Further, the electrical machine generally requires a separate cooling fan for cooling the other components of the electrical machines. These systems lead to bulkiness in design of the electrical machines, as well as inefficiencies and noise.

BRIEF SUMMARY

In one aspect, an electric machine includes a housing assembly, a stator, a rotor, and a fan. The housing assembly includes a first end, a second end, a terminal box positioned at the first end, an end plate coupled to the terminal box, the end plate including a plurality of inlet apertures, and a casing coupled to the end plate and extending toward the second end. The stator is fixedly secured to the housing and positioned within the casing, and the rotor is rotatably secured to the housing and positioned within the casing such that the stator and the rotor are separated within the casing by an air gap. The fan is positioned inside the casing, and the fan is configured to draw air into the housing through the plurality of inlet apertures.

In another aspect, a method of making an electric machine with improved cooling is provided. The method includes (i) providing a housing assembly including a first end and a second end, wherein the housing assembly comprises: (a) a terminal box positioned at the first end, (b) an end plate coupled to the terminal box, wherein the end plate comprises a plurality of inlet apertures, and (c) a casing coupled to the end plate and extending toward the second end, (ii) providing a stator, (iii) fixedly securing the stator to the housing assembly and positioning the stator within the casing, (iv) providing a rotor, (v) rotatably securing the rotor to the housing assembly and positioning the rotor within the casing such that the stator and the rotor are separated within the casing by an air gap, (vi) providing a fan, (vii) positioning the fan inside the casing; and (viii) drawing, by the fan, air into the housing assembly through the plurality of inlet apertures.

DETAILED DESCRIPTION

Described below are an electric machine assembly and a method of providing an electric machine assembly. The electric machine assembly includes a housing assembly including a terminal box including electrical components therein, an end plate including a plurality of inlet apertures, and a casing. The electric machine assembly further includes a stator fixedly secured to the housing assembly, a rotor rotatably secured to the housing assembly, and a fan, and the stator, the rotor, and the fan are all positioned inside the casing. The fan is configured to draw air into the housing assembly through the inlet apertures. The air that the fan draws into the housing assembly cools both the terminal box (more specifically, the electrical components therein) and the stator and rotor. Therefore, the fan positioned within the housing assembly cools the terminal box, electrical components, the rotor, and the stator, and no external fan is required to cool the terminal box and electrical components.

Figure 1:
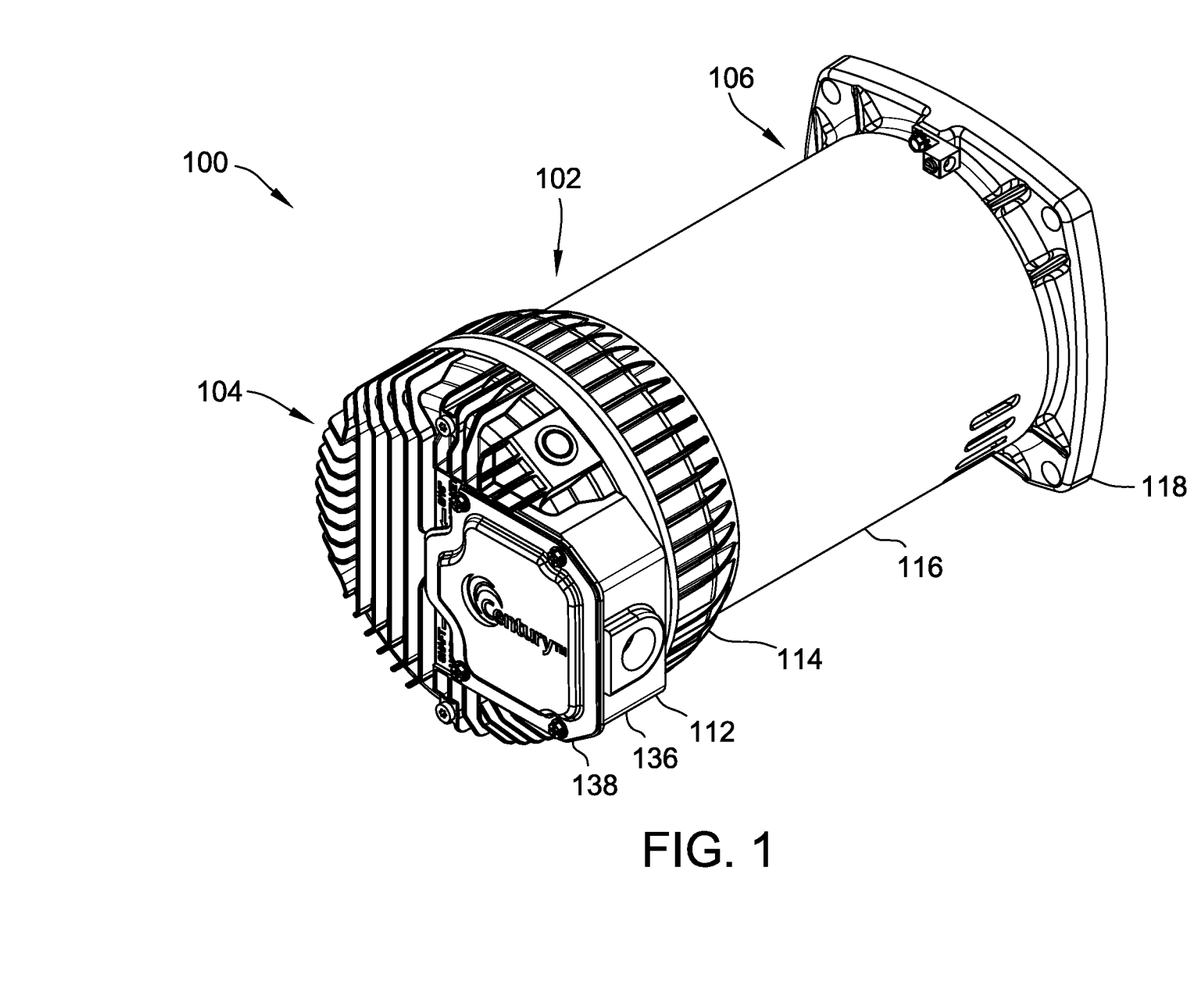
FIG. 1 is a perspective view of a first exemplary electric machine assembly.
Figure 2:
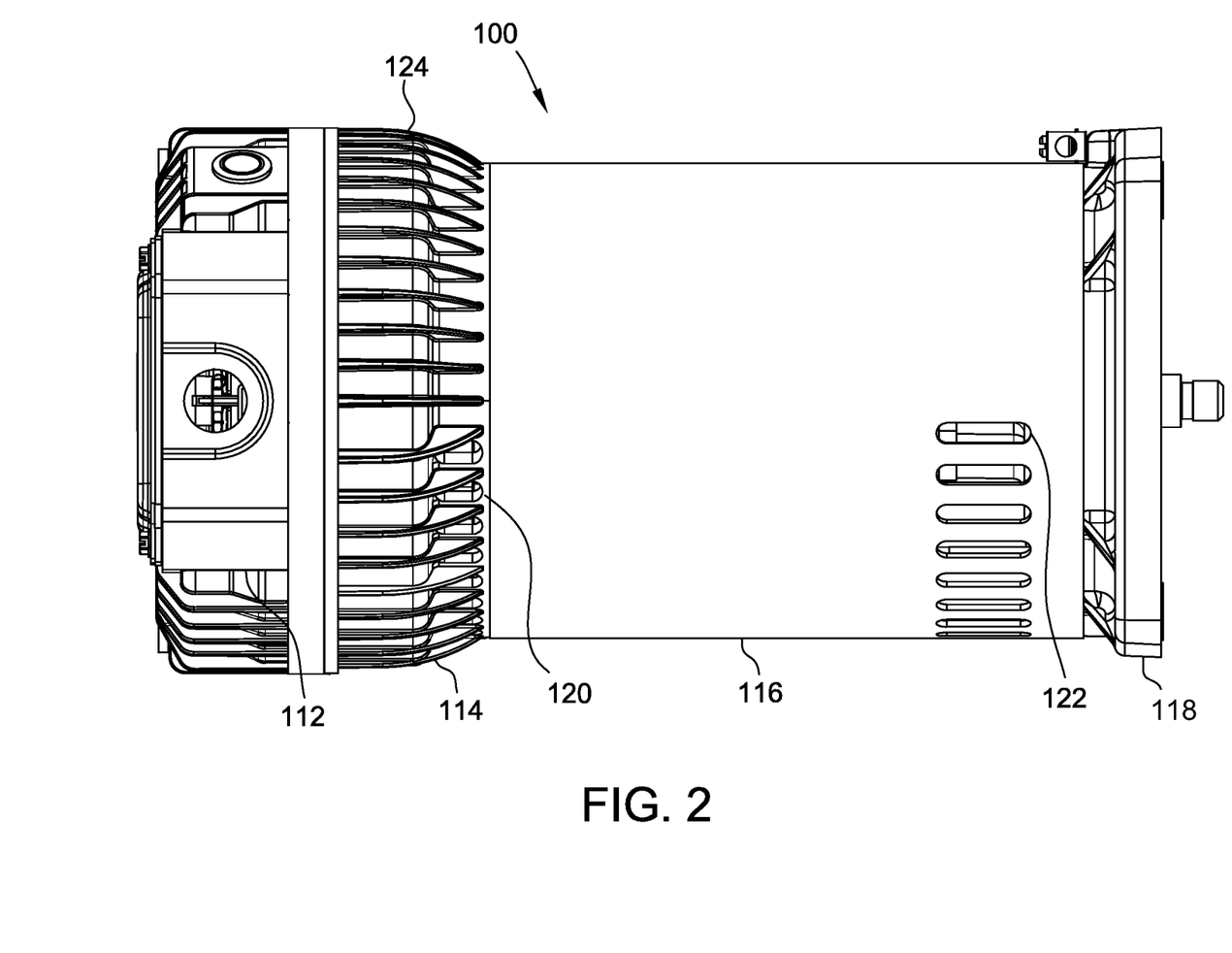
FIG. 2 is a side view of the electric machine assembly shown in FIG. 1.
Figure 3:
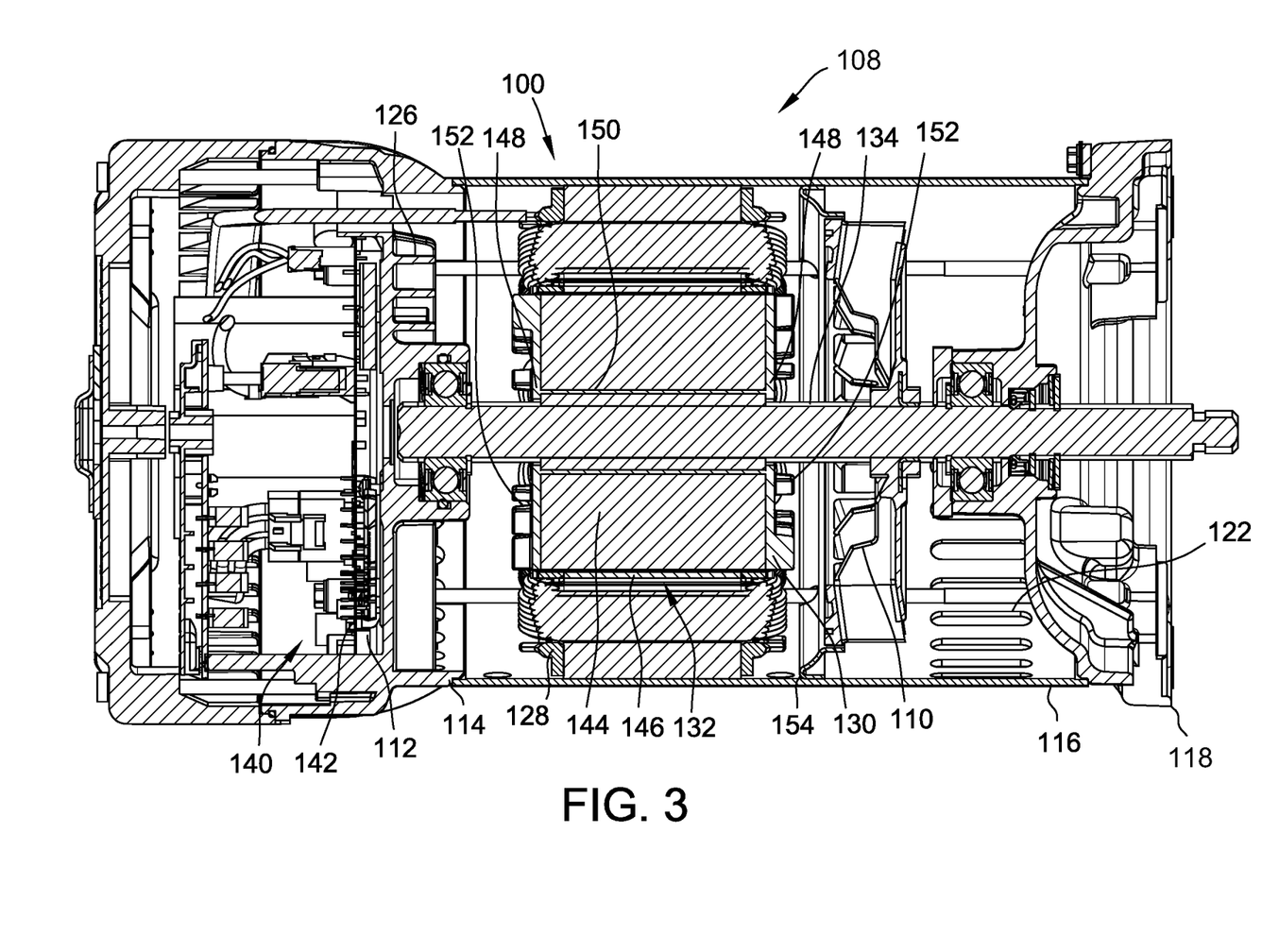
FIG. 3 is a cross-sectional view of the electric machine assembly shown in FIG. 1.

FIG. 1 is a perspective view of a first embodiment of an exemplary electric machine assembly 100; FIG. 2 is a side view of electric machine assembly 100; and FIG. 3 is a cross-sectional view of electric machine assembly 100. Electric machine assembly 100 is also referred to herein as an electric machine.

In the exemplary embodiment, electric machine assembly 100 includes a housing assembly 102 extending from a first end 104 to a second end 106, a motor 108, and a fan 110. Motor 108 and fan 110 are positioned within housing assembly 102. Housing assembly 102 includes a terminal box 112 positioned at first end 104, an end plate 114 coupled to terminal box 112, a casing 116 coupled to end plate 114 and extending toward second end 106, and a mounting base 118 coupled to casing 116 and positioned at second end 106.

End plate 114 includes a plurality of inlet apertures 120 formed therein, and casing 116 includes a plurality of exit apertures 122 formed therein. Exit apertures 122 are formed proximate second end 106. End plate 114 further includes a plurality of exterior fins 124 and a plurality of interior fins 126, as described in more detail in association with FIGS. 5A, 5B, 6A, and 6B.

In the exemplary embodiment, motor 108 is positioned within casing 116 of housing assembly 102 and is coupled to terminal box 112. Motor 108 includes a stator 128 fixedly secured to housing assembly 102 (more specifically, casing 116) and a rotor 130 rotatably secured to housing assembly 102. Stator 128 circumscribes rotor 130. Stator 128 and rotor 130 are positioned within housing assembly 102 such that stator 128 and rotor 130 are separated by an air gap 132. A shaft 134 of motor 108 extends axially through fan 110 and rotor 130, from end plate 114 to mounting base 118. Motor 108 (more specifically, stator 128 and rotor 130) is positioned in casing 116 between the plurality of inlet apertures 120 of end plate 114 and the plurality of exit apertures 122 of casing 116.

In the exemplary embodiment, fan 110 is also positioned within casing 116 of housing assembly 102, and more specifically, positioned axially between mounting base 118 and motor 108. Accordingly, motor 108 (more specifically, stator 128 and rotor 130) is positioned between inlet apertures 120 and fan 110. Fan 110 is configured to draw air into housing assembly 102 through the inlet apertures 120 and expel the air through exit apertures 122. The air flow generated from fan 110 passes through inlet apertures 120, past terminal box 112 and then motor 108 and then fan 110, and exits housing assembly 102 through exit apertures 122. Accordingly, as fan 110 channels air through and around the components of housing assembly 102, the air flow facilitates cooling of both terminal box 112 (and the electrical components housed therein) and motor 108 (more specifically, stator 128 and rotor 130).

Terminal box 112 includes a base 136 and a cover 138 removably coupled to base 136. Base 136 and cover 138 define an internal compartment 140 that houses a plurality of electrical components 142 therein. Electrical components 142 are configured to control motor 108 and fan 110, such that electric machine assembly 100 functions as intended (e.g., within an aquatic space such as swimming pool filter circulation, spa/hot tub circulation, shallow well jet pump transfer, sump sewage and affluent circulation, etc.).

In the exemplary embodiment, rotor 130 includes a plurality of magnets 144 positioned within a rotor frame 146. Rotor frame 146 is overmolded around magnets 144 and includes a pair of opposing end plates 148 connected by a plurality of longitudinal members 150. Members 150 are positioned between adjacent magnets 144.

In the exemplary embodiment, each end plate 148 includes a plurality of axially extending fins 152 that are integrally formed with end plates 148 and members 150 from a plastic material. As rotor 130 rotates, rotor 130 moves and mixes the air, drawn in by fan 110, within housing assembly 102 at a high velocity to channel the air over stator 128 to provide cooling. This high velocity air increases the heat transfer rate from stator 128 via forced convection away from electrical machine assembly and through exit apertures 122.

In the exemplary embodiment, casing 116 of housing assembly 102 includes a bracket 154 that extends from casing 116 to fan 110. Bracket 154 is coupled to fan 110 such that bracket 154 secures fan 110 in place within casing 116 while also allowing fan 110 to freely rotate and function as described herein. Furthermore, bracket 154 extends radially between fan 110 and casing 116 such that an entirety of the air flow channeled axially past motor 108 is also channeled through fan 110.

Figure 4:
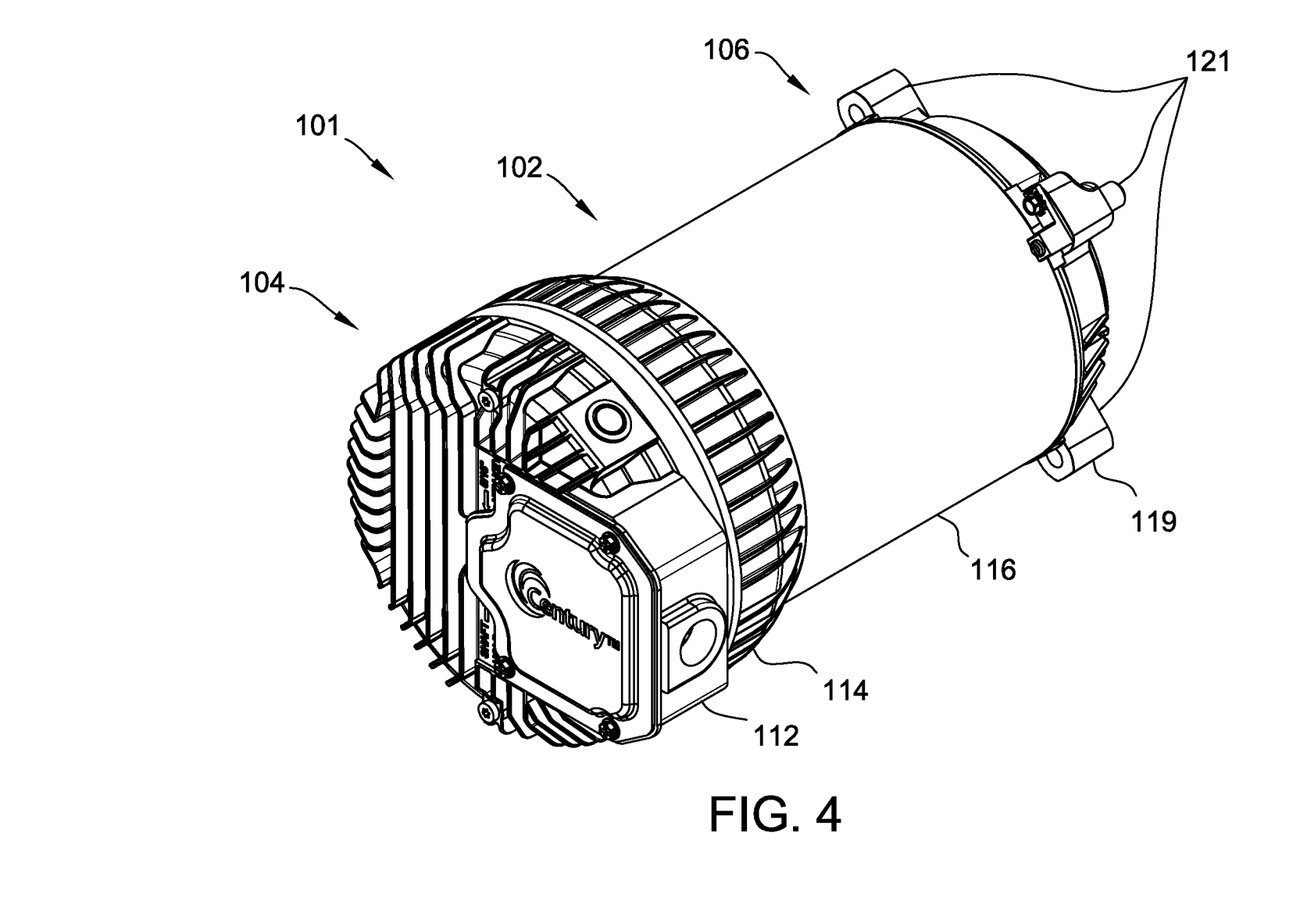
FIG. 4 is a perspective view of a second exemplary electric machine assembly.

FIG. 4 is a perspective view of a second embodiment of an exemplary electric machine assembly 101. Electric machine assembly 101 is substantially similar to electric machine assembly 100 (shown in FIGS. 1-3). Specifically, like electric machine assembly 100, electric machine assembly 101 includes a housing assembly 102 spanning from a first end 104 to a second end 106. The housing assembly 102 includes a terminal box 112 positioned at first end 104, an end plate 114 coupled to terminal box 112, and a casing 116 coupled to end plate 114 and extending toward second end 106. However, housing assembly 102 includes a mounting base 119 that differs from mounting base 118 of electric machine assembly 100 (shown in FIG. 1). Specifically, mounting base 119 includes a plurality of mounting brackets 121 that may be used, for example, to mount electrical machine assembly 101 within an environment in which electrical machine assembly 101 functions within.

Figure 5A:
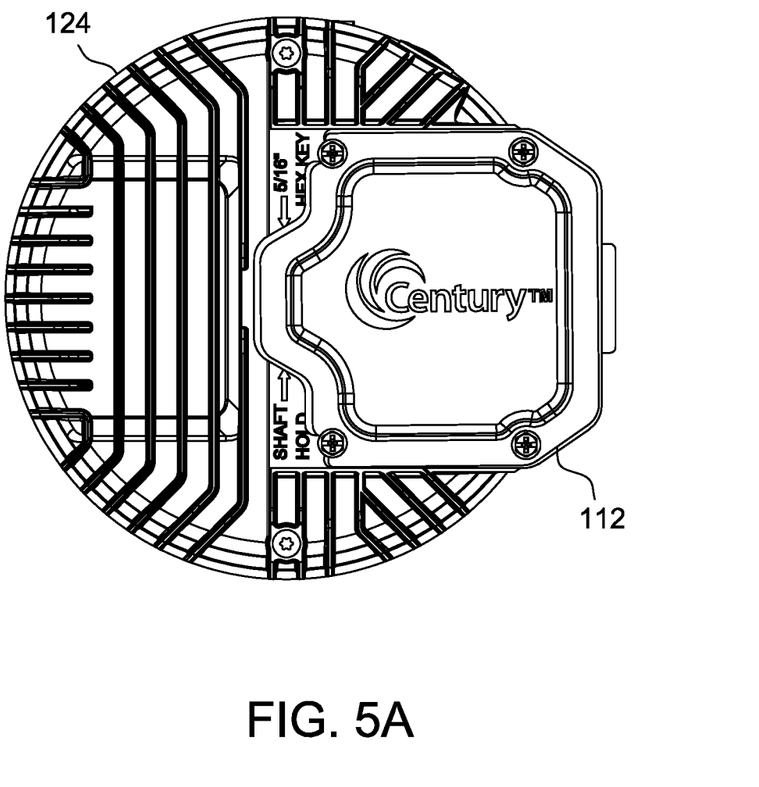
FIG. 5A is a front view of a terminal box of the electric machine assembly shown in FIG. 1.
Figure 5B:
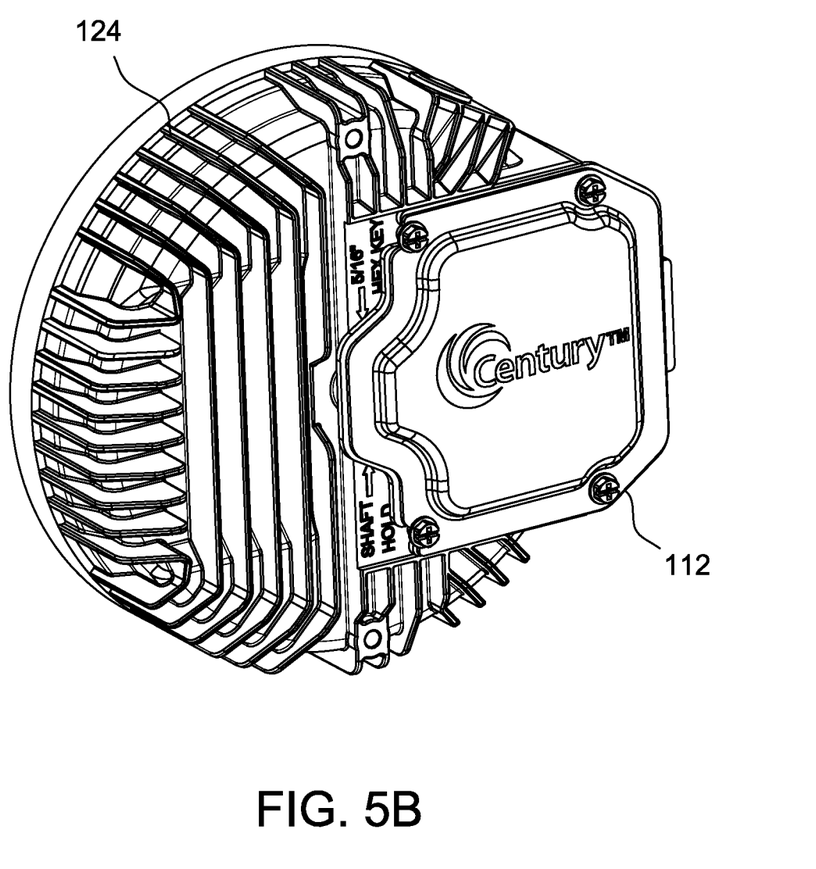
FIG. 5B is a perspective view of the terminal box shown in FIG. 5A.

FIG. 5A is a front view of terminal box 112 of electric machine assemblies 100 and 101 (shown in FIGS. 1-3 and 4, respectively), and FIG. 5B is a perspective view of terminal box 112 of electric machine assemblies 100 and 101. As shown in FIGS. 5A and 5B, terminal box 112 is surrounded by a plurality of exterior fins 124. Exterior fins 124 facilitate the cooling of terminal box 112 (more specifically, electric components 142 of terminal box 112) by increasing a surface area for heat transfer away from terminal box 112.

Figure 6A:
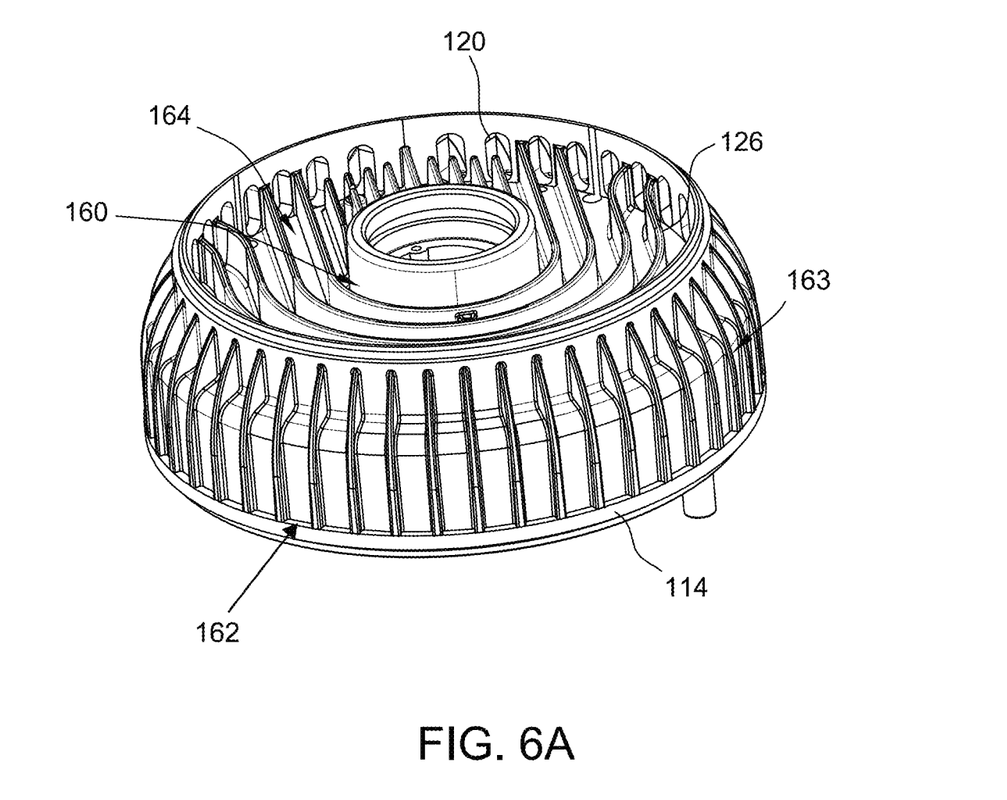
FIG. 6A is a perspective view of an end plate of the electric machine assembly shown in FIG. 1.
Figure 6B:
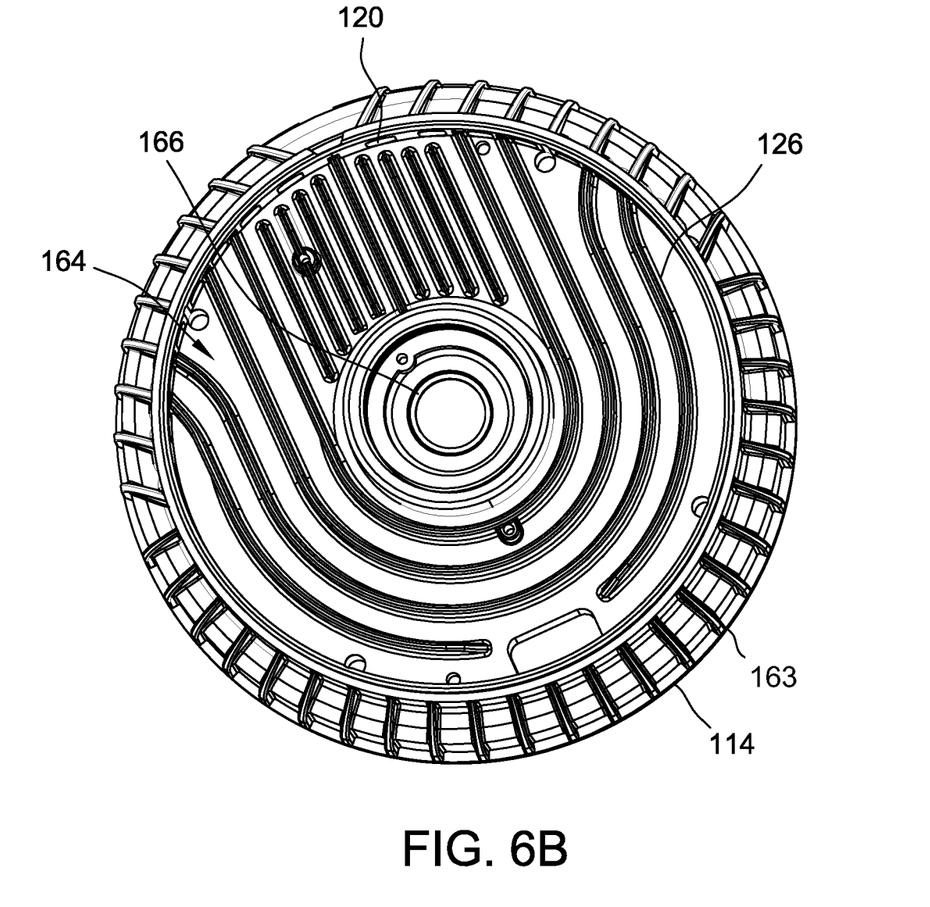
FIG. 6B is a top view of the end plate shown in FIG. 6A.

FIG. 6A is a perspective view of end plate 114 of electric machine assemblies 100 and 101 (shown in FIGS. 1-3 and 4, respectively), and FIG. 6B is a front view of end plate 114 of electric machine assemblies 100 and 101. End plate 114 includes an inner surface 160 and an outer surface 162. Exterior fins 163 are circumferentially spaced around end plate 114 at outer surface 162, and interior fins 126 are formed within end plate 114 at inner surface 160. Inlet apertures 120 are alternatingly circumferentially-spaced with a portion of exterior fins 163, and a portion of interior fins 126 are alternatingly positioned with a portion of inlet apertures 120. In the exemplary embodiment, inlet apertures 120 are formed within one-third of the circumference of end plate 114 (e.g., from 120 degrees to 240 degrees). Interior fins 126 define a plurality of channels 164 between adjacent interior fins 126 within inner surface 160 of end plate 114, and each channel 164 extends between a pair of the portion of inlet apertures 120 positioned with interior fins 126. End plate 114 further includes an aperture 166 formed at the center of end plate 114. Aperture 166 allows end plate 114 to couple with shaft 134 (shown in FIG. 3) of motor 108.

In the exemplary embodiment, electric machine assemblies 100 and 101 have an Open Drip Proof rating of IPX4, meaning that electric machine assemblies 100 and 101 are protected against water splashed from all directions and acceptably limit water ingress within housing assembly 102. In other embodiments, electric machine assemblies 100 and 101 may have any suitable Open Drip Proof rating. Inlet apertures 120 being formed within one-third of the circumference of end plate 114 optimize air flow into housing assembly 102 while also limiting water ingress such that electric machine assemblies 100 and 101 may have Open Drip Proof ratings. Further, the positioning, size, and location of exit apertures 122 create a channel for appropriate drainage for any water within housing assembly 102.

Figure 7A:
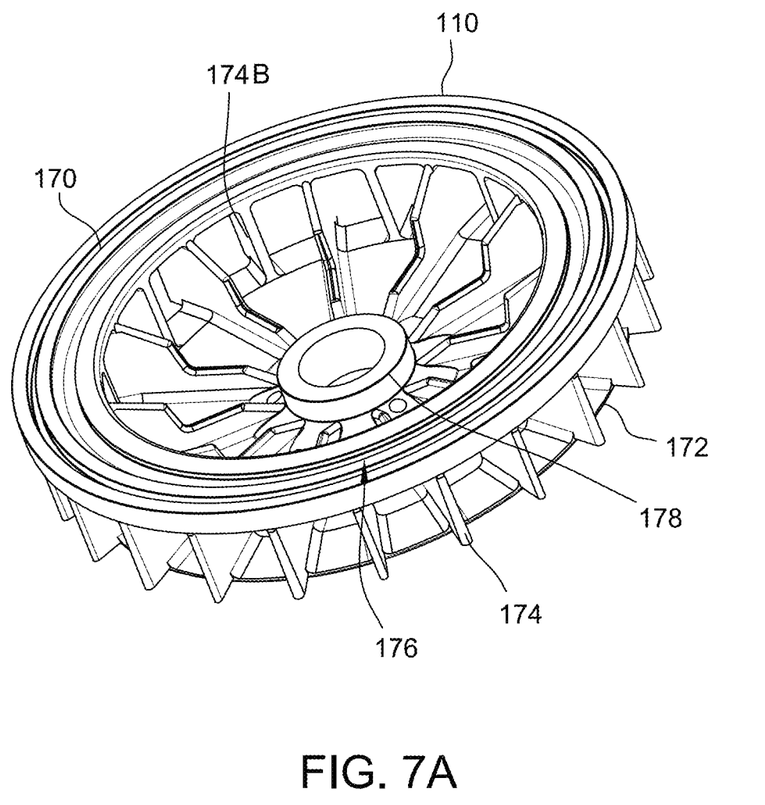
FIG. 7A is a top perspective view of a fan of the electric machine assembly shown in FIG. 1.
Figure 7B:
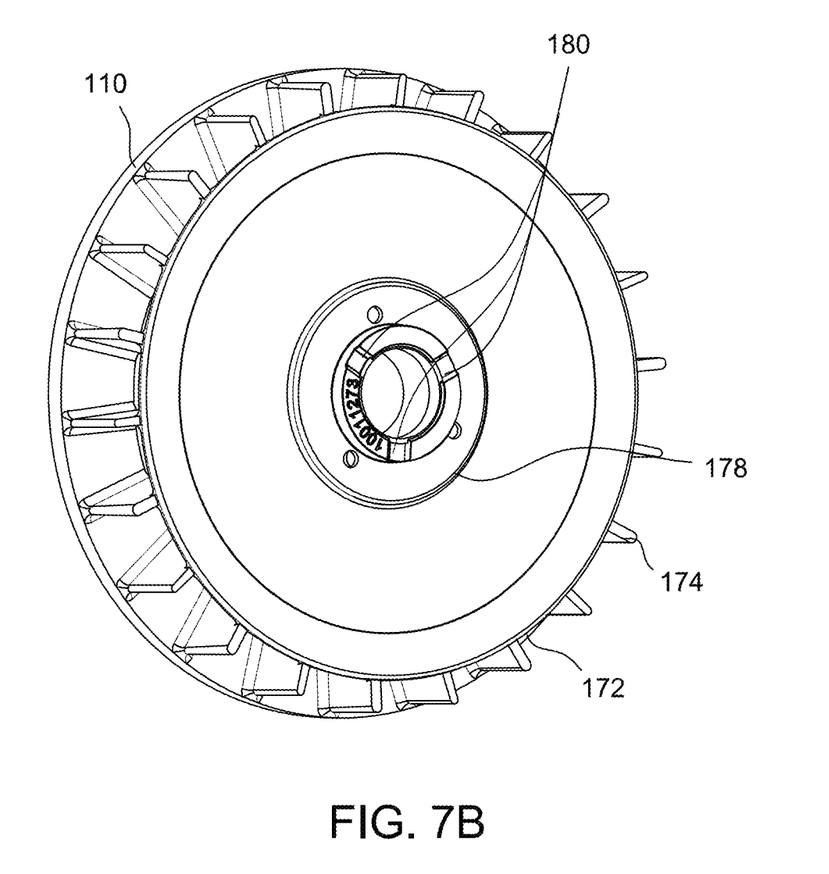
FIG. 7B is a side perspective view of the fan shown in FIG. 7A.

FIG. 7A is a front perspective view of fan 110 of electric machine assemblies 100 and 101 (shown in FIGS. 1-3 and 4, respectively), and FIG. 7B is a back perspective view of fan 110 of electric machine assemblies 100 and 101.

In the exemplary embodiment, fan 110 includes an end ring 170, an end plate 172, and a plurality of blades 174 extending axially between end ring 170 and end plate 172. Blades 174 extend radially beyond a periphery of end plate 172, and blades 174 terminate radially inward of a periphery of end ring 170. End ring 170 includes a plurality of circumferential grooves 176 defined therein opposite blades 174. Fan 110 further includes a hub 178, and blades 174 include a first plurality of blades 174 that extend from hub 178 and a second plurality of blades 174B that are spaced from hub 178.

In the exemplary embodiment, hub 178 is configured to accept shaft 134 of motor 108 (shown in FIGS. 1-3). Hub 178 includes a plurality of notches 180. In the exemplary embodiment, notches 180 are circumferentially spaced 120 degrees apart from each other notch 180. The spacing of notches 180 provide mechanical relief when fan 110 is installed onto shaft 134.

Exemplary embodiments of an electric machine assembly are described above in detail. The electric machine assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

The apparatus, methods, and systems described herein provide an electric machine assembly with an internal fan (i.e., a fan positioned within housing assembly of electric machine assembly) configured to draw air into the housing assembly to cool both a terminal box including electrical components therein and a motor including a rotor and a stator. The benefits derived from the internal fan include eliminating the need for an external fan to cool the terminal box and electrical components therein. Further, the electric machine assembly has an Open Drip Proof rating, meaning the electric machine assembly facilitates the minimization of water ingress within the electric machine assembly.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric machine, comprising:
a housing assembly including a first end and a second end, wherein the housing assembly comprises:
a terminal box positioned at the first end;
a casing extending toward and positioned at the second end, wherein the casing defines an internal compartment; and
an end plate coupled to and positioned between the casing and the terminal box, an outer surface of the end plate exposed between the casing and the terminal box and wherein the end plate comprises;
a plurality of inlet apertures,
a plurality of exterior fins extending from and circumferentially spaced around the outer surface, between the casing and the terminal box, and
a plurality of interior fins at an inner surface, opposite the outer surface;
a stator fixedly secured to the housing assembly and positioned within the internal compartment defined by the casing;
a rotor rotatably secured to the housing assembly and positioned within the internal compartment defined by the casing such that the stator and the rotor are separated within the casing by an air gap; and
a fan positioned within the internal compartment defined by the casing, wherein the fan is configured to draw air into the housing assembly through the plurality of inlet apertures.

2. The electric machine as in claim 1, wherein the plurality of inlet apertures are formed through the outer surface of the end plate and are alternatingly circumferentially-spaced with the plurality of exterior fins.

3. The electric machine as in claim 1, wherein the plurality of interior fins are alternatingly positioned with the inlet apertures.

4. The electric machine as in claim 3, wherein the plurality of interior fins define a plurality of channels between adjacent fins of the plurality of interior fins, and wherein each channel extends from one inlet aperture to another of the inlet apertures.

5. The electric machine as in claim 1, wherein the casing comprises a plurality of exit apertures formed proximate the second end.

6. The electric machine as in claim 5, wherein the fan is configured to draw air into the housing assembly through the plurality of inlet apertures and to expel air through the plurality of exit apertures.

7. The electric machine as in claim 6, wherein the fan channels air past the stator and the rotor within the internal compartment to facilitate cooling before the air is expelled through the plurality of exit apertures.

8. The electric machine as in claim 1, wherein the rotor and the stator are positioned such that the air drawn into the plurality of inlet apertures flows past the rotor and the stator before interacting with the fan.

9. The electric machine as in claim 1, wherein the housing assembly further comprises a mounting base coupled to the casing and positioned at the second end.

10. The electric machine as in claim 1, wherein the fan comprises:
an end ring;
an end plate; and
a plurality of blades extending axially between the end ring and the end plate.

11. The electric machine as in claim 10, wherein the end ring comprises a plurality of circumferential grooves defined therein.

12. The electric machine as in claim 10, wherein the plurality of blades extend radially beyond a periphery of the end plate.

13. The electric machine as in claim 12, wherein the plurality of blades terminate radially inward of a periphery of the end ring.

14. The electric machine as in claim 10, wherein the end plate comprises a hub, and wherein the plurality of blades comprises a first plurality of blades that extend from the hub and a second plurality of blades that are spaced from the hub.

15. A method of making an electric machine with improved cooling, the method comprising:
providing a housing assembly including a first end and a second end, wherein the housing assembly comprises:
(i) a terminal box positioned at the first end, (ii) a casing extending toward and positioned at the second end, wherein the casing defines an internal compartment, and (iii) an end plate coupled to and positioned between the casing and the terminal box, an outer surface of the end plate exposed between the casing and the terminal box and wherein the end plate comprises:
 a plurality of inlet apertures,
 a plurality of exterior fins extending from and circumferentially spaced around the outer surface, between the casing and the terminal box, and
 a plurality of interior fins at an inner surface, opposite the outer surface;
fixedly securing a stator to the housing assembly and positioning the stator within the internal compartment defined by the casing;
rotatably securing a rotor to the housing assembly and positioning the rotor within the internal compartment defined by the casing such that the stator and the rotor are separated within the casing by an air gap; and
positioning a fan inside the casing, the fan configured to draw air into the housing assembly through the plurality of inlet apertures.

16. The method of claim 15 further comprising:
providing a plurality of exit apertures formed proximate the second end; and
positioning the rotor and stator such that the air drawn into the plurality of inlet apertures flows past the rotor and the stator.

17. The method of claim 16 further comprising:
positioning the plurality of exit apertures such that the air drawn into the plurality of inlet apertures flows past the rotor and the stator before the air is expelled through the plurality of exit apertures.

18. The method of claim 15 further comprising:
positioning the fan to channel air past the stator and the rotor within the internal compartment to facilitate cooling.

19. An electric machine, comprising:
a housing assembly including a first end and a second end, wherein the housing assembly comprises:
a terminal box positioned at the first end;
a casing extending toward and positioned at the second end, wherein the casing defines an internal compartment; and
an end plate coupled to and positioned between the casing and the terminal box, an outer surface of the end plate exposed between the casing and the terminal box and wherein the end plate comprises:
a plurality of exterior fins extending from and circumferentially spaced around the outer surface, between the casing and the terminal box, and a plurality of inlet apertures formed through the outer surface of the end plate and alternatingly, circumferentially-spaced with the plurality of exterior fins;
a stator fixedly secured to the housing assembly and positioned within the internal compartment defined by the casing;
a rotor rotatably secured to the housing assembly and positioned within the internal compartment defined by the casing such that the stator and the rotor are separated within the casing by an air gap; and
a fan positioned within the internal compartment defined by the casing, wherein the fan is configured to draw air into the housing assembly through the plurality of inlet apertures.

* * * * *